US012716430B2

(12) United States Patent
K et al.

(10) Patent No.: US 12,716,430 B2
(45) Date of Patent: Aug. 25, 2026

(54) SINGLE ACTING HYDRAULIC CYLINDER WITH HEAD END CUSHIONING

(71) Applicant: WIPRO ENTERPRISES PVT. LTD., Bengaluru (IN)

(72) Inventors: Srinivasa K, Bengaluru (IN); Shivakumar B G S S S, Bengaluru (IN)

(73) Assignee: WIPRO ENTERPRISES PVT. LTD., Bengaluru (IN)

( * ) Notice: Subject to any disclaimer, the term of this patent is extended or adjusted under 35 U.S.C. 154(b) by 0 days.

(21) Appl. No.: 19/319,526

(22) Filed: Sep. 4, 2025

(65) Prior Publication Data

US 2026/0063152 A1 Mar. 5, 2026

(51) Int. Cl.
*F15B 15/22* (2006.01)
*F15B 15/14* (2006.01)
*F15B 15/20* (2006.01)

(52) U.S. Cl.
CPC ........ *F15B 15/204* (2013.01); *F15B 15/1447* (2013.01); *F15B 15/149* (2013.01); *F15B 15/222* (2013.01); *F15B 15/224* (2013.01); *F15B 2211/7052* (2013.01)

(58) Field of Classification Search
CPC .............. F15B 15/1447; F15B 15/1452; F15B 15/1457; F15B 15/1461; F15B 15/149; F15B 15/204; F15B 15/222; F15B 15/223; F15B 15/224; F15B 15/227
See application file for complete search history.

(56) References Cited

U.S. PATENT DOCUMENTS

| | | | | |
|---|---|---|---|---|
| 6,558,430 | B1 * | 5/2003 | Nakaya | F16F 9/486<br>623/44 |
| 8,985,950 | B2 * | 3/2015 | Lopez | B64C 27/51<br>416/106 |
| 9,638,221 | B2 * | 5/2017 | Masuta | F15B 15/1457 |
| 9,863,407 | B2 * | 1/2018 | Yi | F15B 15/222 |
| 10,451,093 | B2 * | 10/2019 | Kobayashi | F15B 15/222 |
| 12,188,495 | B2 * | 1/2025 | Pilcher | F15B 15/1442 |
| 12,196,229 | B2 * | 1/2025 | Zhu | F15B 15/223 |

FOREIGN PATENT DOCUMENTS

| | | | | |
|---|---|---|---|---|
| WO | WO-2012088836 A1 * | 7/2012 | | F15B 15/224 |
| WO | WO-2024249059 A1 * | 12/2024 | | F15B 20/007 |

* cited by examiner

*Primary Examiner* — Michael Leslie
(74) *Attorney, Agent, or Firm* — The Inventor's Friend Patent Law Firm, P.L.L.C.; Nathaniel A. Wickliffe

(57) ABSTRACT

The disclosure herein relates to a single acting hydraulic cylinder (100) configured to provide a smooth extension stroke of a piston (102). The cylinder (100) includes a piston rod (108) connected to the piston (102), wherein the piston rod (108) has a plurality of orifices (110) defined at pre-determined positions, and the piston (102) has a groove (106) defined in fluid communication with the orifices (110) and a fluid gallery (104) defined in the piston (102). The orifices allow fluid to flow from an annular side chamber (124) to a full-bore side chamber (125) via the fluid gallery at end of extension stroke, to gradually dampen impact of the piston (102) with a cylinder head end cover (130). The cylinder prevents jolts and jerks in a hydraulic system, provides better control, and ease in operation.

9 Claims, 4 Drawing Sheets

SINGLE ACTING HYDRAULIC CYLINDER WITH HEAD END CUSHIONING

TECHNICAL FIELD

The embodiments herein generally relate to hydraulic cylinders and more particularly, to a single acting hydraulic cylinder configured to have a smooth cushioning effect at end of extension stroke.

BACKGROUND

A single-acting hydraulic cylinder is a type of actuator that uses hydraulic pressure to produce force in one direction only. The single acting hydraulic cylinder typically consists of a piston rod and optionally with a piston, which are connected together and housed within a cylindrical barrel/body, with hydraulic fluid entering through a single port to push the piston in one direction. The return motion of the piston is usually spring assisted or gravity assisted. Single-acting hydraulic cylinders are commonly used in applications where a simple, unidirectional force is needed, such as in lifting mechanisms, clamping devices, and agricultural machinery.

In some applications which require higher safety measures during operation, such as in operation of an aerial work platform, the movement of the piston rod needs to be controlled to prevent any sudden movement of the platform connected to the hydraulic system. To prevent sudden movement of the piston rod, hydraulic cylinders employ cushioning effect to control the speed and force of the piston as it approaches the end of its stroke. Without cushioning, the piston can impact the cylinder head or base at high velocity, leading to excessive noise, vibration, and potential damage to the cylinder and connected components. The sudden deceleration can also cause hydraulic shock, which can compromise the integrity of the entire hydraulic system. Therefore, cushioning is essential to enhance the durability, and safety of hydraulic cylinders by reducing the impact forces during the end-of-stroke phase.

Conventionally, a cushion sleeve or spear is attached to the piston or cylinder end to achieve the cushioning effect in the hydraulic cylinder. As the piston nears the end of its stroke, the cushion sleeve or spear progressively restricts the flow of hydraulic fluid, creating a controlled deceleration. However, the cushion sleeve type cushioning has limitations to be sized within a narrow annular space in cylinder. Another method involves the use of adjustable cushion valves, which allow for fine-tuning of the cushioning effect by regulating the fluid flow through dedicated cushion passages. However, the adjustable cushion valves configuration for head end/rod end cushioning is feasible only for a double acting hydraulic cylinder where outflow through retraction port is restricted through the adjustable cushion valves and is not feasible to be adopted in the single acting hydraulic cylinder. Additionally, some cylinders incorporate an orifice and/or flow control valves directly into the cylinder to modulate the fluid flow and provide cushioning. However, the combination of check valve with orifices is adopted for this design inside the cylinder instead of design solely on the flow control valves.

Despite the effectiveness of the methods, there are drawbacks associated with the existing ways of achieving the cushioning effect in hydraulic cylinders. For example, the space required for integrating cushioning components can limit the compactness and versatility of the hydraulic cylinder design. This can restrict the use of cushioningequipped cylinders in certain environments or lead to the need for custom designs, further increasing costs. Furthermore, the provision of the single orifice in the cylinder barrel to modulate the fluid flow fails to provide a smooth cushioning effect at end of extension stroke. The fluid flow rate is suddenly reduced in the chamber of the cylinder which causes a jerk or jolt in the piston rod when the piston nears the end-of extension stroke.

Therefore, there exists a need for a single acting hydraulic cylinder which obviates the aforementioned drawbacks.

Objects

The principal object of embodiments herein is to provide a single acting hydraulic cylinder which provides a smooth cushioning at end of an extension stroke thereby preventing any sudden jerk through the hydraulic cylinder.

Another object of embodiments herein is to provide the single acting hydraulic cylinder with a head end cushioning mechanism that enhances the durability and safety of hydraulic cylinders by reducing the impact forces during end of stroke phase.

Another object of embodiments herein is to provide the single acting hydraulic cylinder which facilitates any fluid trapped in an annular side chamber to flow to a full-bore side chamber of a cylinder housing.

Another object of embodiments herein is to provide the single acting hydraulic cylinder with cushioning mechanism that provides controlled operation of a hydraulic system coupled to an aerial work platform thereby providing smooth movement of the aerial work platform.

Another object of embodiments herein is to provide the single acting hydraulic cylinder with the cushioning mechanism that dampens impact of the piston with a cylinder head end cover thereby preventing damage to components of the single acting hydraulic cylinder, and is easy to manufacture, and does not require any additional components or additional space for packaging.

These and other objects of embodiments herein will be better appreciated and understood when considered in conjunction with following description and accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments are illustrated in the accompanying drawings, throughout which like reference letters indicate corresponding parts in various figures. The embodiments herein will be better understood from the following description with reference to the drawings, in which.

DETAILED DESCRIPTION

Figure 1:
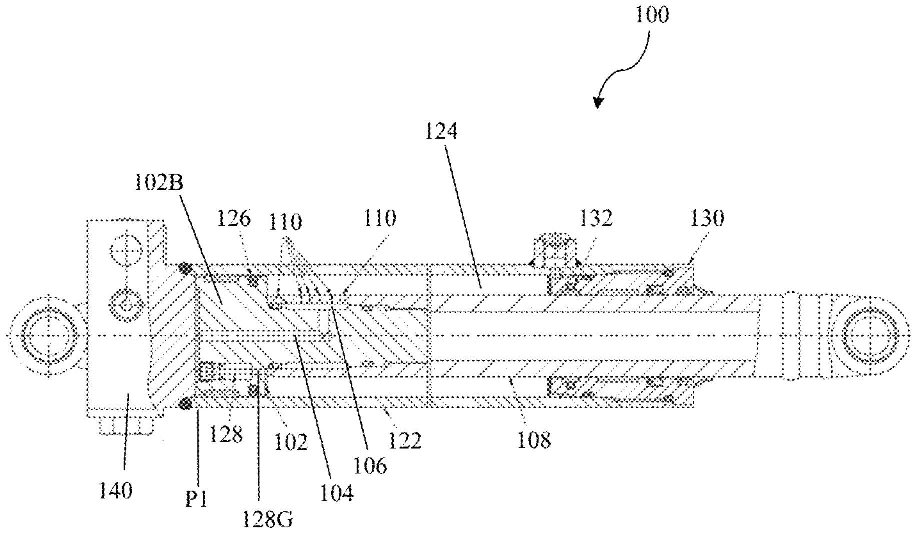
FIG. 1 depicts a sectional view of a single acting hydraulic cylinder showing a piston in an initial position, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a single acting hydraulic cylinder which provides a smooth cushioning at end of an extension stroke thereby preventing any sudden jerk through the hydraulic cylinder. Further, embodiments herein achieve the single acting hydraulic cylinder with cushioning mechanism that provides controlled operation of a hydraulic system coupled to an aerial work platform thereby providing smooth movement of the aerial work platform. Referring now to the drawings FIGS. 1 through 4, where similar reference characters denote corresponding features consistently throughout the figures, there are shown embodiments.

Figure 2:
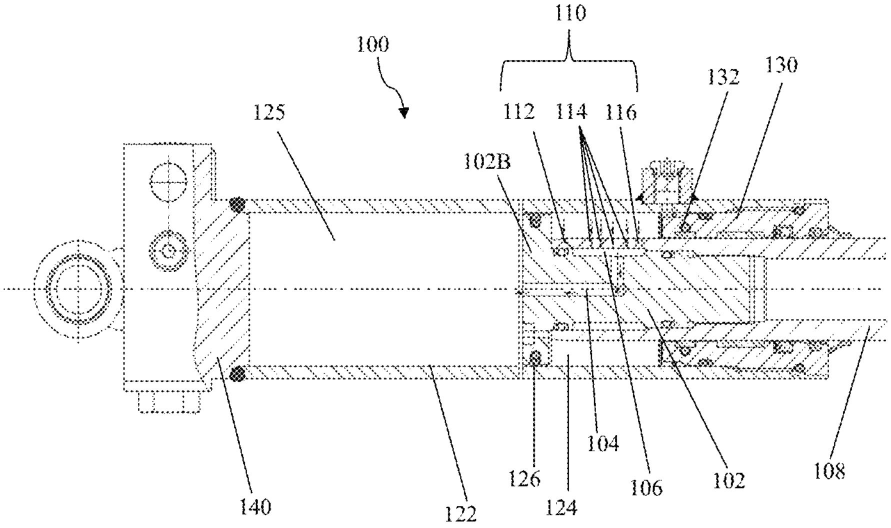
FIG. 2 depicts a sectional view of the single acting hydraulic cylinder showing the piston in an intermediate position, according to embodiments as disclosed herein.
Figure 3:
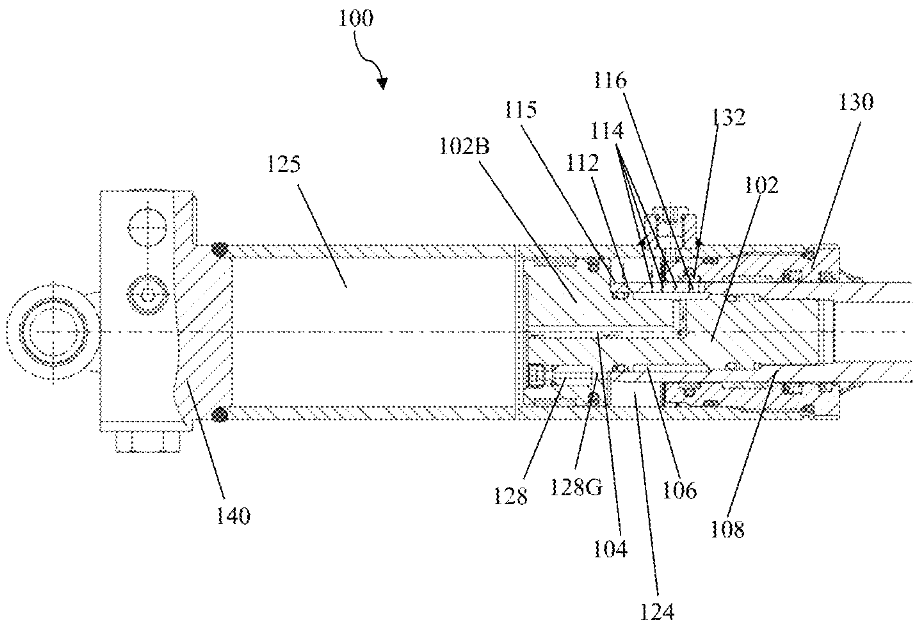
FIG. 3 depicts a sectional view of the single acting hydraulic cylinder showing the piston at start of cushioning, according to embodiments as disclosed herein.
Figure 4:
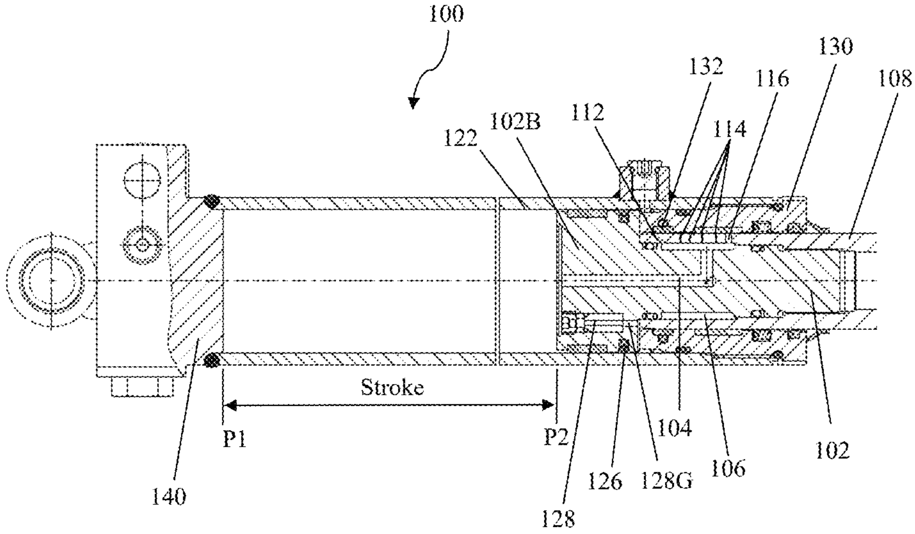
FIG. 4 depicts a sectional view of the single acting hydraulic cylinder showing the piston in a completely extended position, according to embodiments as disclosed herein.

FIGS. 1 and 2 depict sectional views of the single acting hydraulic cylinder (100), according to embodiments as disclosed herein. The hydraulic cylinder (100) includes a piston (102), a piston rod (108) connected with the piston (102), and a cylinder head end cover (130) housed in a cylinder housing (122) of the single acting hydraulic cylinder (100). The piston (102) is adapted to be actuated hydraulically for moving the piston (102) from an initial position (P1) (as shown in FIG. 1) to an extended position (P2) (as shown in FIG. 4). In the initial position (P1), the piston (102) is adapted to be in contact with a cylinder cap end cover (140) of the single acting hydraulic cylinder (100), and in the extended position (P2) the piston (102) is adapted to be in contact with the cylinder head end cover (130) of the single acting hydraulic cylinder (100). In an embodiment, the piston (102) is adapted to return to the initial position (P1) from the extended position (P2) with release of oil from the cylinder to a tank and assisted by gravity. The piston rod (108) is connected with the piston (102) such that when the piston (102) is moved from the initial position (P1) to the extended position (P2), the piston rod (108) is adapted to extend outwards from the cylinder housing (122) of the single acting hydraulic cylinder (100). When the piston (102) returns back to the initial position (P1) from the extended position (P2), the piston rod (108) retracts into the cylinder housing (122) of the single acting hydraulic cylinder (100). The cylinder head end cover (130) is disposed/defined within the cylinder housing (122) of the single acting hydraulic cylinder (100) and is adapted to receive the piston rod (108) when the piston (102) is moved from the initial position (P1) to the extended position (P2). In an embodiment, the cylinder head end cover (130) is adapted to house a cushioning seal (132) (as shown in FIGS. 1 to 4). The cushioning seal (132) is adapted to receive the piston rod (108) therethrough when the piston (102) is moved from the initial position (P1) to the extended position (P2) to reduce speed of the piston (102) near the cylinder head end cover (130) by covering orifices (110) (as shown in FIG. 1) provided on the piston rod (108) thereby dampening the movement of the piston rod (108). Further, the single acting hydraulic cylinder (100) includes an inlet port (not shown) to allow fluid flow into the cylinder housing (122) of the single acting hydraulic cylinder (100), and a piston seal (126) (as shown in FIGS. 1, 2 and 4) provided on the piston (102) to restrict flow of fluid at a base (102B) (as shown in FIG. 2) of the piston (102). The fluid entering the cylinder housing (122) of the single acting hydraulic cylinder (100) is accumulated near the base (102B) of the piston (102) and exerts a pressure on the base (102B) of the piston (102), thereby pushing the piston (102) from the cylinder cap end cover (140) towards the cylinder head end cover (130) in the cylinder housing (122) of the single acting hydraulic cylinder (100). Although the piston seal (126) restricts the flow of the fluid at the base (102B) of the piston (102), some of the fluid flows into an annular side chamber (124) (as shown in FIGS. 1 to 3) of the cylinder housing (122). The annular side chamber (124) is defined between the piston (102) and the cylinder head end cover (130). As the piston (102) approaches the cylinder head end cover (130) (as shown in FIG. 2), the cushioning seal (132) provided in the cylinder head end cover (130) reduces the speed of the piston (102) by covering orifices (110) (as shown in FIG. 1) provided on the piston rod (108) thereby dampening the movement of the piston rod (108). This reduction in speed of the piston (102) results in accumulation of the fluid in the annular side chamber (124) when the piston (102) progresses towards the extended position (P2).

FIGS. 3 and 4 depict sectional views of the single acting hydraulic cylinder (100), according to embodiments as disclosed herein. In an embodiment, the piston (102) includes a fluid gallery (104) defined in the piston (102), and a groove (106) defined in fluid communication with the fluid gallery (104). The fluid gallery (104) extends between the base (102B) of the piston (102) and the groove (106). The fluid gallery (104) is adapted to direct the fluid entering through the groove (106) of the piston (102) to flow to a full-bore side chamber (125) (as shown in FIG. 2) adjacent to the cylinder cap end cover (140). The full-bore side chamber (125) of the cylinder housing (122) is defined between the base (102B) of the piston (102) and the cylinder cap end cover (140). In an embodiment, the piston rod (108) includes a plurality of orifices (110) defined at pre-determined positions therein. The groove (106) of the piston (102) is in fluid communication with the orifices (110). The plurality of orifices (110) are adapted to allow fluid accumulated in the annular side chamber (124) to flow into the fluid gallery (104) through the groove (106) and the fluid from the fluid gallery (104) flows to the full-bore side chamber (125) of the cylinder housing (122) for reducing a speed of movement of the piston (102) towards the cylinder head end cover (130) thereby dampening impact of the piston (102) with the cylinder head end cover (130) at end of an extension stroke in which the piston (102) is moved to the extended position (P2). Further, each of the orifices (110) is defined at a corresponding pre-determined position in the piston rod (108) such that each of the orifices (110) are sequentially covered by the cushioning seal (132) in cylinder head end cover (130) of the cylinder (100) (shown in FIGS. 2, 3, and 4), thereby gradually closing flow of fluid from the annular side chamber (124) to full-bore side chamber (125) through the orifices (110) when the piston (102) is moved to the extended position (P2). This sequential closing of the orifices (110) ensures that area of fluid flow out of the annular side chamber (124) is gradually decreased, which prevents sudden decrease in rate of fluid flow, thereby providing a smooth extending stroke. In an embodiment, the plurality of orifices (110) (as shown in FIGS. 1 and 2) includes at least one first orifice (112), at least two second orifices (114) and at least one third orifice (116) (as shown in FIGS. 2 to 4). The at least one first orifice (112) is defined in the piston rod (108) near the base (102B) of the piston (102). For the purpose of this description and ease of understanding, the first orifice (112) is considered to be an angular orifice which is defined in the piston rod (108) at a predefined angle with respect to an axis of the piston rod (108). The predefined angle of the first orifice (112) is 40 degrees with respect to the axis of the piston rod (108) thereby providing an inclined flow path for fluid to flow from the annular side chamber (124) into the groove (106) thereby allowing the fluid to flow into the fluid gallery (104). In an embodiment, the first orifice (112) has a diameter of 0.8+/−0.1 mm. The first orifice (112) provides an inclined flow path for fluid to flow from the annular side chamber (124) into the groove (106) defined in the piston (102). The inclined flow path ensures that any fluid trapped near the cylinder head end cover (130) in the annular side chamber (124) is returned through the fluid gallery (104) in the piston (102) (shown in FIG. 4). Further, the at least two second orifices (114) are defined in the piston rod (108) perpendicular to the axis of the piston rod (108) and are arranged in a linear or angular array from the at least one first orifice (112). In an embodiment, the piston rod (108) has four number of second orifices (114). Each second orifice (114) has a diameter of 0.38+/−0.05 mm. Furthermore, the at least one third orifice (116) is defined on the piston rod (108) perpendicular to the axis of the piston rod (108) and is positioned subsequent to the linear or angular array of the at least two second orifices (114). In one embodiment, each of the second and third orifices (114, 116) are in-line to each other. In another embodiment, each of the second and third orifices (114, 116) are positioned at different orientations on the piston rod (108) in a parallel plane. For example, each of the second and third orifices (114, 116) are radially positioned on the piston rod (108) in the parallel planes. In an embodiment, the third orifice (116) has a diameter of 2.5+/−0.1 mm. The at least one third orifice (116) is adapted to be covered by the cushioning seal (132) in cylinder head end cover (130) (shown in FIG. 2) and subsequently the second orifices (114) (as shown in FIG. 3) and the first orifice (112) (as shown in FIG. 4) are adapted to be covered by the cushioning seal (132) and the cylinder head end cover (130) in a sequential manner thereby reducing speed of the piston (102) moving towards the cylinder head end cover (130) when the piston (102) is moved from the initial position (P1) to the extended position (P2). The piston rod (108) includes a tapered portion (115) (as shown in FIG. 3) adapted to facilitate fluid flow from the annular side chamber (124) to the first orifice (112) at end of extension stroke, wherein the tapered portion (115) is adjacent to the base (102B) of the piston (102) and houses an inlet of the first orifice (112). In an embodiment, the cushioning seal (132) is adapted to cover the orifices (110) block flow of fluid into the orifices (110) thereby reducing speed of the piston (102) near the cylinder head end cover (130) when a section of the piston rod (108) having the plurality of orifices (110) is received by the cylinder head end cover (130) during movement of the piston (102) from the initial position (P1) to the extended position (P2).

Further, in an embodiment, single acting hydraulic cylinder (100) includes a check valve (128) (as shown in FIGS. 1, 3 and 4) disposed within the piston (102). The check valve (128) is configured to allow fluid to flow from the full-bore side chamber (125) to the annular side chamber (124) of the single acting hydraulic cylinder (100) when the piston (102) is displaced from the extended position (P2) to initial position (P1) during retraction stroke to fill annular side chamber (124) before the orifices (110) fully open out into the annular side chamber (124) for smooth retraction. The check valve (128) restricts flow path for the fluid in the annular side chamber (124) to flow back towards the full-bore side chamber (125) during smooth cushioning at end of extension stroke. In an embodiment, the check valve (128) is provided in fluid communication with the annular side chamber (124) through a second fluid gallery (128G) (as shown in FIGS. 1, 3 and 4) defined in the piston (102).

The technical advantages of the single acting hydraulic cylinder (100) are as follows. The single acting hydraulic cylinder (100) is provided with a cushioning mechanism that enhances the durability, and safety of hydraulic cylinders by reducing the impact forces during end of stroke phase. The single acting hydraulic cylinder (100) with the cushioning mechanism provides controlled operation of a hydraulic system coupled to an aerial work platform thereby providing smooth movement of the aerial work platform. The single acting hydraulic cylinder (100) dampens impact of the piston with a cylinder head end cover through cushioning thereby preventing damage to components of the single acting hydraulic cylinder. Smooth and controlled extension stroke of the piston, provides enhanced safety by preventing any sudden jerk or movement in the hydraulic system, and is easy to manufacture, and does not require any additional components or additional space for packaging.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modifications within the spirit and scope of the embodiments as described herein.

What is claimed is:

1. A single acting hydraulic cylinder (100) comprising:

a piston (102) adapted to be actuated hydraulically for moving said piston (102) from an initial position (P1) to an extended position (P2); and a piston rod (108) connected with said piston (102), wherein said piston rod (108) has a plurality of orifices (110) defined at pre-determined positions therein, wherein said piston (102) has a groove (106) provided in fluid communication with said plurality of orifices (110) of said piston rod (108) and a fluid gallery (104) defined in said piston (102); and said plurality of orifices (110) are adapted to allow fluid accumulated in an annular side chamber (124) of a cylinder housing (122) to flow into said fluid gallery (104) through said groove (106), and the fluid from the fluid gallery (104) flows to a full-bore side chamber (125) of said cylinder housing (122), and each of said orifice (110) is sequentially covered by a cushioning seal (132) provided in a cylinder head end cover (130) of said hydraulic cylinder (100) to block flow of fluid from said annular side chamber (124) to said orifices (110) for reducing a speed of movement of said piston (102) towards said cylinder head end cover (130) thereby dampening impact of said piston (102) with said cylinder head end cover (130) at end of an extension stroke in which said piston (102) is moved to said extended position (P2).

2. The single acting hydraulic cylinder (100) as claimed in claim 1, wherein each of said orifices (110) are sequentially covered by said cushioning seal (132) provided in said cylinder head end cover (130) thereby gradually closing flow of fluid from said annular side chamber (124) to said full-bore side chamber (125) through said orifices (110) when said piston (102) is moved to the extended position (P2).

3. The single acting hydraulic cylinder (100) as claimed in claim 1, wherein said plurality of orifices (110) comprises:

at least one first orifice (112) defined in said piston rod (108);

at least two second orifices (114) defined in said piston rod (108) perpendicular to an axis of said piston rod (108) and are arranged in a linear or angular array from said at least one first orifice (112); and at least one third orifice (116) defined in said piston rod (108) perpendicular to said axis of said piston rod (108) and is positioned subsequent to said second orifices (114), wherein said at least one third orifice (116) is adapted to be covered by said cushioning seal (132) housed in said cylinder head end cover (130), and subsequently said second orifices (114) and said first orifice (112) are adapted to be covered by said cushioning seal (132) in said cylinder head end cover (130) in a sequential manner thereby reducing the speed of movement of said piston (102) towards said cylinder head end cover (130) when said piston (102) is moved from said initial position (P1) to said extended position (P2).

4. The single acting hydraulic cylinder (100) as claimed in claim 3, wherein said first orifice (112) is an angular orifice which is defined in said piston rod (108) at a predefined angle with respect to said axis of said piston rod (108);

said first orifice (112) is located adjacent to a base (102B) of said piston (102);

each of said second and third orifices (114, 116) are in-line to each other or positioned at different orientations on said piston rod (108) in a parallel plane; and said first orifice (112) has a diameter of 0.8+/−0.1 mm, wherein the predefined angle of said first orifice (112) is 40 degrees with respect to said axis of said piston rod (108) thereby providing an inclined flow path for fluid to flow from said annular side chamber (124) into said groove (106).

5. The single acting hydraulic cylinder (100) as claimed in claim 3, the plurality of second orifices (114) includes four number of second orifices (114), wherein each of said second orifice (114) has a diameter of 0.38+/−0.05 mm; and said third orifice (116) has a diameter of 2.5+/−0.1 mm.

6. The single acting hydraulic cylinder (100) as claimed in claim 4, wherein said piston rod (108) includes a tapered portion (115) adapted to facilitate fluid flow from said annular side chamber (124) to said first orifice (112) at end of extension stroke, wherein said tapered portion (115) is defined on said piston rod (108) and is positioned adjacent to said base (102B) of said piston (102) and houses an inlet of the first orifice (112).

7. The single acting hydraulic cylinder (100) as claimed in 1, wherein said single acting hydraulic cylinder (100) includes a check valve (128) disposed within said piston (102), wherein said check valve (128) is configured to restrict fluid to flow from said annular side chamber (124) to said full-bore side chamber (125) adjacent to a cylinder cap end cover (140) of said cylinder (100) during smooth cushioning at end of extension stroke; and said check valve (128) is configured to allow fluid to flow from said full-bore side chamber (125) to said annular side chamber (124) of said single acting hydraulic cylinder (100) when said piston (102) is displaced from the extended position (P2) to initial position (P1) during retraction stroke to fill said annular side chamber (124) before said orifices (110) fully open out into said annular side chamber (124) for smooth retraction.

8. The single acting hydraulic cylinder (100) as claimed in claim 7, wherein said check valve (128) is provided in fluid communication with said annular side chamber (124) through a second fluid gallery (128G) defined in said piston (102).

9. The single acting hydraulic cylinder (100) as claimed in claim 1, wherein the sequential closing of said orifices (110) by said cushioning seal (132) ensures that area of fluid flow out of said annular side chamber (124) is gradually decreased which in turn prevents sudden decrease in rate of fluid flow thereby providing a smooth extending stroke; and said piston (102) is adapted to return to the initial position (P1) from the extended position (P2) by effect of gravity with release of oil from the cylinder to a tank and assisted by gravity.

* * * * *